UNITED STATES PATENT OFFICE.

JOSEPH LONES, OF SMETHWICK, ENGLAND, ASSGINOR TO WILLIAM WALKER, JR., FRANK RICHARD WILKINS, JABEZ LONES, EDWARD HOLDEN, JOHN HARLEY BURT, AND JOHN WHYMAN, OF BIRMINGHAM, ENGLAND.

PROCESS OF UTILIZING SPENT BATTERY SOLUTIONS.

SPECIFICATION forming part of Letters Patent No. 620,466, dated February 28, 1899.

Application filed November 22, 1897. Serial No. 659,511. (No specimens.)

*To all whom it may concern:*

Be it known that I, JOSEPH LONES, a subject of the Queen of Great Britain, residing at Smethwick, England, have invented a certain new and useful Process of Utilizing Spent Battery Solutions, (for which I have obtained Letters Patent of Great Britain No. 19,308, dated September 1, 1896;) and I do hereby declare that the following is a full, clear, and exact description of the invention, which will enable others skilled in the art to which it appertains to make and use the same.

In the working of voltaic batteries in which the exciting liquid is a solution of caustic potash or caustic soda the spent or exhausted exciting liquid consists of a solution of caustic potash or caustic soda saturated or nearly saturated with oxid of zinc.

The object of my invention is the economical recovery of the dissolved zinc and the revivifying of the solution of potash or soda—that is, the restoration of its causticity—by which revivifying the said solution is fitted to be again employed as the exciting liquid of a voltaic battery.

I will describe my invention in connection with a spent solution of caustic potash.

In carrying my invention into effect I proceed as follows: I treat the spent solution—that is, the solution of potash charged with oxid of zinc—with a suitable sulfid for precipitating the zinc. My preferred method of performing this step of the process is to heat the spent solution to boiling and slowly add flowers of sulfur to the boiling solution so long as a precipitate is formed in the boiling liquid. The flowers of sulfur form, with the potash, sulfid of potassium, by which the zinc in the solution is precipitated as sulfid of zinc, nine ounces of flowers of sulfur to a gallon of spent solution having a specific gravity of 1.22 being generally sufficient. Instead, however, of using flowers of sulfur to form in the spent solution under treatment sulfid of potassium I may apply the latter reagent, prepared in any other suitable manner, direct to the solution or I may pass sulfureted hydrogen, generated in any suitable manner, through the solution, the object being to precipitate the zinc in the form of a sulfid. The said sulfid of zinc is separated from the liquid by filtration or by subsidence and decantation. The said sulfid is washed, the first washings being added to the clear liquor and the precipitate afterward dried. The sulfid of zinc may be treated in the way hereinafter described or used for any purpose to which sulfid of zinc is or may be applicable.

By the process described some thiosulfate of potash is formed which may be removed in either of the following ways: First, by the use of peroxid of hydrogen. The treated spent solution is allowed to cool and a strong solution of peroxid of hydrogen is slowly added, the solution being constantly stirred until it is found on testing that the whole of the thiosulfate has been oxidized into sulfate. This may be ascertained on a small scale by taking a small quantity of the liquid—say in a test-tube—and ascertaining that it no longer possesses the property of dissolving chlorid of silver. Secondly, the thiosulfate of potash may be converted into sulfate of potash by the use of peroxid of barium. The peroxid of barium is first mixed with water and the mixture is slowly added to the treated spent solution, the solution being constantly stirred during the addition of the peroxid of barium. The solution is tested from time to time in the way already described until it is found that the clear solution no longer possesses the property of dissolving chlorid of silver.

The solution treated in either of the ways above described for the conversion of any thiosulfate of potash into sulfate of potash is then diluted until a specific gravity of 1.05 is obtained. It is then boiled and cream of lime — that is, a mixture of quicklime and water—added for the purpose of saturating the sulfuric acid and causticizing any carbonate of potash which may have been formed during the working of the battery by absorption of carbonic acid from the air. The boiling is continued for about thirty minutes and the solution is treated with a little baryta-water to remove any remaining sulfate. The clear liquid is then separated and evaporated until it has acquired its original strength, when it may be reused in a voltaic battery.

The sulfid of zinc obtained by the method described may be reduced to metallic zinc by the well-known methods, or it may be treated so as to fit it for use as a white pigment.

For the sake of simplicity of description I have referred only to a solution of caustic potash as the exciting liquid of the battery and to the recovery of zinc from the spent solution by the use, among other methods, of sulfid of potassium. I wish it, however, to be understood that a solution of caustic soda may be employed as the exciting liquid of the battery, and in place of sulfid of potassium for the recovery of the zinc from the spent solution sulfid of sodium may be employed. The sulfid of sodium may be prepared, purified, and used in the ways hereinbefore described with respect to sulfid of potassium.

Having now particularly described and ascertained the nature of my invention and in what manner the same is to be performed, I declare that I claim as my invention—

The herein-described process for recovery of residual products from the spent solution of voltaic batteries in which the positive metal is zinc and the exciting liquid is a solution of a caustic alkali, which consists in treating said spent solution with a sulfid to precipitate the zinc contained therein in the form of sulfid of zinc, separating the precipitate from the liquid and subsequently treating the filtrate with an oxidizing agent so as to convert any thiosulfate of the alkali into sulfate of the said alkali, further treating the solution with cream of lime and afterward with baryta-water so as to remove the sulfate contained therein and finally, separating the clear liquid from any suspended matter and evaporating the said clear liquid until it has acquired a strength sufficient to fit it for reuse as the exciting liquid of a voltaic battery, substantially as specified.

JOSEPH LONES. [L. S.]

Witnesses:
GEORGE SHAW,
ARTHUR JOHN POWELL.